United States Patent Office 3,812,013
Patented May 21, 1974

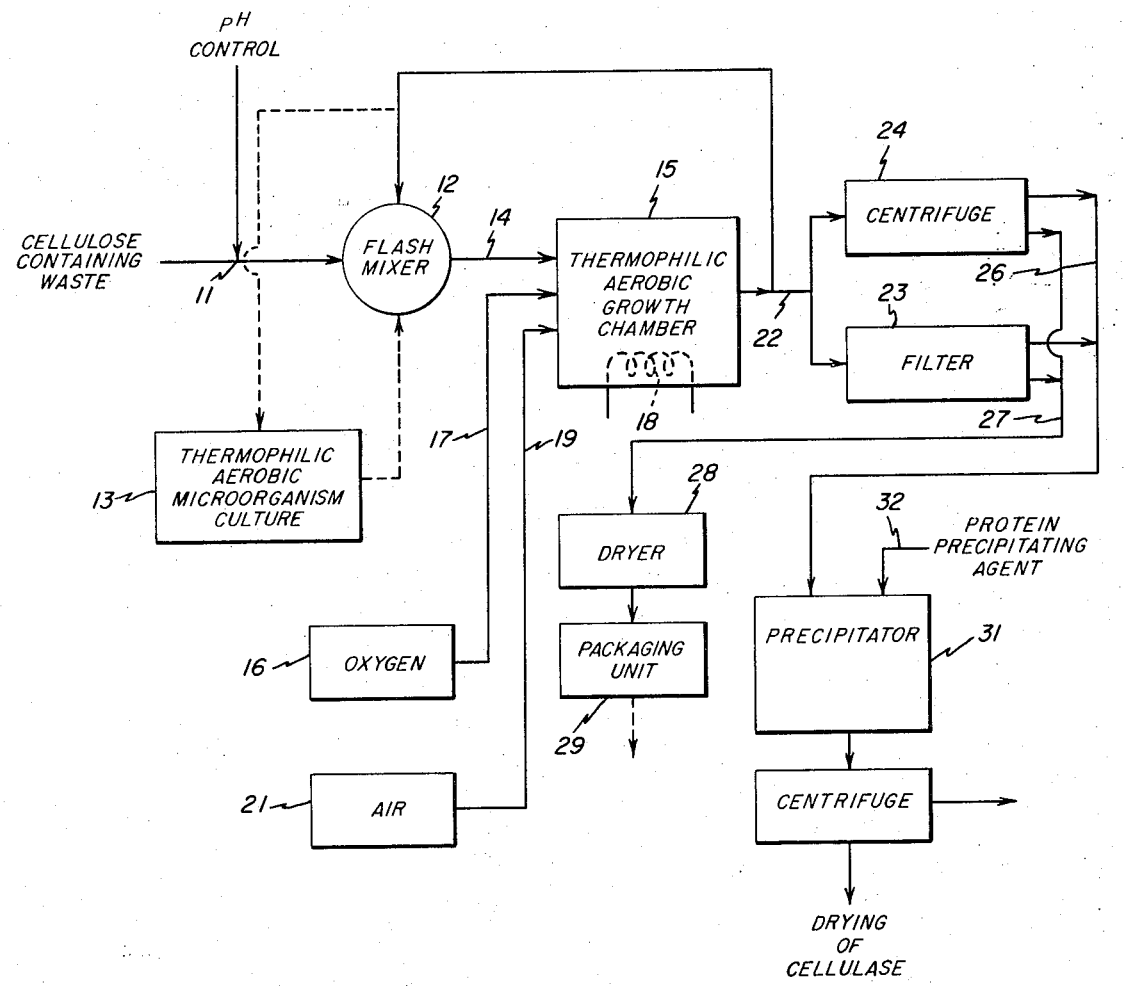

3,812,013
SOLUBLE CELLULASE ENZYME PRODUCTION
Winthrop D. Bellamy, Schenectady, and Ananda M. Chakrabarty, Latham, N.Y., assignors to General Electric Company
Filed Mar. 1, 1972, Ser. No. 230,666
Int. Cl. C07g 7/02
U.S. Cl. 195—66 R                7 Claims

ABSTRACT OF THE DISCLOSURE

A process for the preparation of an improved soluble cellulase material is described. Optimum activity for this cellulase enzyme occurs over a broader range of pH and at a higher temperature than the cellulase produced by mesophilic fungi.

BACKGROUND OF THE INVENTION

Cellulase enzyme material that is now commercially available is produced by the activity of mesophilic fungi at room temperature. Such cellulase enzymes display optimum activity at a pH of 4.7 and at a temperature of 45° C. Further, due to the lack of stability of these enzymes to heat, this enzyme material cannot be used at temperatures in excess of about 50° C. An example of commercial cellulase is a product made by Sigma® Chemical Company (St. Louis, Missouri) produced during the growth of *Aspergillus niger*, a mesophilic fungi. The material is referred to as "Cellulase—Practical Grade—Type 1."

The industrial application for cellulase enzymes can be significantly expanded by making available cellulase enzymes displaying optimum activity over broader ranges of pH and at higher temperatures and having greater heat stability.

SUMMARY OF THE INVENTION

The above-noted objectives have been achieved with the instant invention, which is productive of cellulase enzyme(s) using thermophilic microorganisms that generate extra-cellular enzymes during growth on cellulose-containing waste material.

In addition to displaying optimum activity at pH levels ranging from 5.5 to 8 and at temperatures ranging from about 65 to 80° C., these enzymes may be stored at room temperature. In contrast thereto the mesophilic enzymes must be stored at temperatures below 0° C. in order to preserve the activity thereof.

BRIEF DESCRIPTION OF THE DRAWING

The exact nature of this invention as well as other objects and advantages thereof will be readily apparent from consideration of the following specification relating to the annexed drawing in which is shown a schematic flow sheet illustrating the preferred process of this invention.

DESCRIPTION OF THE PREFERRED EMBODIMENT

A process is described in U.S. 3,462,275—Bellamy (incorporated by reference) for the growth of thermophilic organisms on solid, organic biodegradable waste materials containing cellulose at temperatures from 45° C. to 80° C. with agitation while introducing oxygen to the mixture.

As is taught in the Bellamy patent, the reacted waste mixture leaving the thermophilic aerobic growth chamber consists of a liquid medium and a solid cellular proteinaceous material. The cellular proteinaceous material is separated from the liquid medium, dried and packaged for use as an animal feed supplement material or as a source of extractable protein. The liquid medium, or waste liquor, may be discharged from the system (after chlorination, if necessary), may be passed through a sewage plant or may be returned to the growth chamber.

It has been found that thermophilic actinomyces (employed in the Bellamy process) grown on cellulose-containing materials generate soluble extra-cellular enzymes containing significant concentrations of soluble cellulase enzymes. These soluble cellulase enzymes can be separated from the balance of the waste liquor by the use of conventional protein precipitating agents, such as methanol and ammonium sulfate, for example.

Cellulose-containing waste, for example excrement from ruminants (pretreated as described in U.S. Patent Application Ser. No. 230,668—Bellamy et al., filed Mar. 1, 1972 and assigned to the assignee of the instant invention), is subjected to the Bellamy process as follows. The biodegradable waste is monitored for pH level and the pH is adjusted at station 11 as required to maintain a range of pH from 5.5 to 8.5. This adjustment of pH is made in the conventional manner utilizing suitable chemicals, such as hydrochloric acid or sodium hydroxide or other inexpensive acid or alkali.

The organic biodegradable cellulose-containing waste is then passed into mixing chamber 12. In the mixing chamber 12 the waste and thermophilic actinomyces culture from vessel 13 are agitated violently until a uniform mixture of waste and microorganism culture is obtained.

The mixture 14 is then passed into the thermophilic aerobic growth chamber 15 which contains means for heating (or cooling) 18 and an oxygen inlet line 17. In the growth chamber 15, the mixture is heated to from 45° C. to 80° C., while oxygen is supplied to the mixture from oxygen source 16 (or by supplying air through line 19 from air source 21) for a period of time of from 2 to 24 hours.

Under these conditions the thermophilic actinomyces multiply rapidly and digest the organic biodegradable waste to yield pasteurized cellular proteinaceous and other cellular materials at temperatures in excess of 55° C. After the process is started, it may be necessary to provide a coolant to regulate the temperature. A portion of the reacted waste mixture 22 exiting from the thermophilic growth chamber 15 can then be returned either to mixing chamber 12 for inoculation of further organic biodegradable waste or to the thermophilic aerobic microorganism culture vessel 13, and thereafter added as culture to the mixing chamber 12. The reacted waste mixture 22 from the thermophilic aerobic growth chamber 15 is passed through a filter 23 (or centrifuge 24) yielding a liquid 26 and a solid cellular proteinaceous material 27.

As taught in the Bellamy patent, the solid cellular proteinaceous material may be conducted to a drier 28 and then to a packaging unit 29.

The liquid medium (as "waste liquor" or "supernatant broth") is conducted to precipitator 31 wherein it is mixed with a conventional protein precipitating agent supplied via line 32. In the case of acetone, the waste liquor is mixed with twice as much acetone by volume in order to precipitate all of the cellulase.

The resulting mixture and precipitate are conducted to a centrifuge 33 (or to a filter) to separate the cellulase enzyme precipitate from the mixture of liquids. The mixture of liquids may then be conducted to a separator (not shown) in which the modified waste liquor is separated from the protein precipitating agent, which latter is recovered for recirculation. The waste liquor is disposed of as described hereinabove in connection with the Bellamy patent.

The cellulase recovered in this manner can be air dried at room temperature to provide a dry crude enzyme powder. If desired, the crude enzyme powder can be subjected to fractional precipitation, if it is desirous to produce the pure cellulase enzyme product.

Recovery of the cellulase may be either batch or continuous. Thus by way of example precipitator 31 could be in the form of a proportioning device in flow communication with conduits 26, 32 and with a receiving conduit of sufficient length to provide the requisite time for precipitation of the cellulase. The output from the conduit would pass to centrifuge 33 for the separation step. Also, if desired, instead of a single tank 31 as shown, a series of tanks 31 could be arranged to sequentially receive flow from conduits 26, 32 in order to continuously accommodate the output from filter 23 or centrifuge 24.

The cellulase enzyme product of this invention has been found to be stable for long periods at room temperature and at 0° C. It has an optimum activity temperature in excess of 60° C. and an optimum pH in the range from about 5.5 to about 8. The higher temperature toluerance and wider pH range makes this thermostable cellulase product useful in industrial processes that cannot employ the mesophilic cellulase enezymes.

A typical use for the cellulase product of this invention is for the removal of cellulose from the effluent produced in paper manufacture. In removing cellulose from effluents the cellulase enzymes degrade the cellulose to soluble glucose material typically consisting of from about 2 to about 5 glucose units. It has been proposed to utilize the glucose so produced by fermenting the treated effluent with yeast to produce yeast protein.

What we claim as new and desire to secure by Letters Patent of the United States is:

1. A process for the manufacture of cellulase enzymes comprising the steps of:
   (a) mixing solid biodegradable cellulose-containing waste with thermophilic actinomyces culture in a liquid medium having a pH between 5.5 and 8.5,
   (b) introducing an oxygenating gas into the mixture so as to maintain the dissolved oxygen content at a valve of at least 0.3 mg. per liter of said mixture,
   (c) maintaining said mixture at a temperature of from 55 to 80° C. to favor growth of the thermophilic actinomyces on said waste,
   (d) separating the cellular protein aceous material and waste liquor produced by said growth,
   (e) adding a protein precipitating agent to at least a portion of the waste liquor to precipitate the cellulase enzyme content thereof,
   (f) separating the cellulase enzyme precipitate from the liquid component and
   (g) drying the cellulase enzyme so recoverd.

2. The process recited in claim 1 wherein the solid biodegradable cellulose-containing waste is waste from ruminants.

3. The process recited in claim 1 wherein the cellulase enzyme recovered is subjected to further purification.

4. The process recited in claim 1 wherein the cellulase enzyme manufacture is continuous.

5. The process recited in claim 1 wherein the protein precipitating agent is acetone.

6. The process recited in claim 1 wherein the oxygenating gas is air.

7. A dried cellulose-degrading enzyme product that retains cellulase activity when stored at temperatures above 0° C. this cellulase activity being displayed at pH levels ranging from about 5.5 to about 8 and at temperatures in excess of 60° C. to degrade cellulose to soluble glucose material.

References Cited

UNITED STATES PATENTS

| 3,462,275 | 8/1969 | Bellamy | 99—9 |
|---|---|---|---|
| 3,398,055 | 8/1968 | Bruno | 195—66 |

OTHER REFERENCES

Gould: Cellulases and Their Applications, American Chem. Soc. Publications, 1971, p. 394.

Stutzenberger: Applied Microbiology, 1971, pp. 147–152.

Singleton et al.: Bacteriological Reviews (1973), vol. 37, No. 3 pp. 320–342.

A. LOUIS MONACELL, Primary Examiner

T. G. WISEMAN, Assistant Examiner

U.S. Cl. X.R.

195—33